July 13, 1943.  L. E. COWEY  2,324,281
SHOCK ABSORBER STRUT OR OLEO LEG FOR AIRCRAFT
Filed Jan. 24, 1941  2 Sheets-Sheet 1

LEONARD EUGENE COWEY
INVENTOR:

BY
Haseltine Lake & Co.
ATTORNEYS

July 13, 1943.　　　　L. E. COWEY　　　　2,324,281
SHOCK ABSORBER STRUT OR OLEO LEG FOR AIRCRAFT
Filed Jan. 24, 1941　　　2 Sheets-Sheet 2

LEONARD EUGENE COWEY
INVENTOR

BY
Haseltine, Lake & Co.
ATTORNEYS

Patented July 13, 1943

2,324,281

UNITED STATES PATENT OFFICE 2,324,281

SHOCK ABSORBER STRUT OR OLEO LEG FOR AIRCRAFT

Leonard Eugene Cowey, Kew Gardens, England

Application January 24, 1941, Serial No. 375,730
In Great Britain July 22, 1940

3 Claims. (Cl. 267—64)

This invention relates to shock absorber struts or oleo legs for aircraft and is an improvement in or modification of the oleo-pneumatic shock absorber strut forming the subject of my co-pending United States Patent application Serial No. 328,230, filed April 6, 1940, now Patent Number 2,279,447, issued April 14, 1942.

The present invention is more particularly concerned with the positioning and construction of the valve provided for supplying air and oil to the compression cylinder and with the adjustment of the cam to enable the tail wheel to be easily and quickly aligned when the oleo leg is in position on the aircraft.

In the construction disclosed by the specification and drawings of the co-pending patent application above referred to, the valve for supplying air and oil was situated at the upper end of the leg and consequently when the leg was mounted in the fuselage of an aircraft the valve was somewhat inaccessible, whilst furthermore it was necessary to provide a dip tube in communication with the valve and depending beneath the surface of the oil to provide an oil seal to ensure the retention of the necessary air pressure.

The chief object of the invention is to enable the air and oil supply valve to be situated in a position in which it is readily accessible when the leg is in position within the fuselage of an aircraft, and at the same time to provide a more simple and effective oil seal.

Referring to the drawings.

Figure 1:
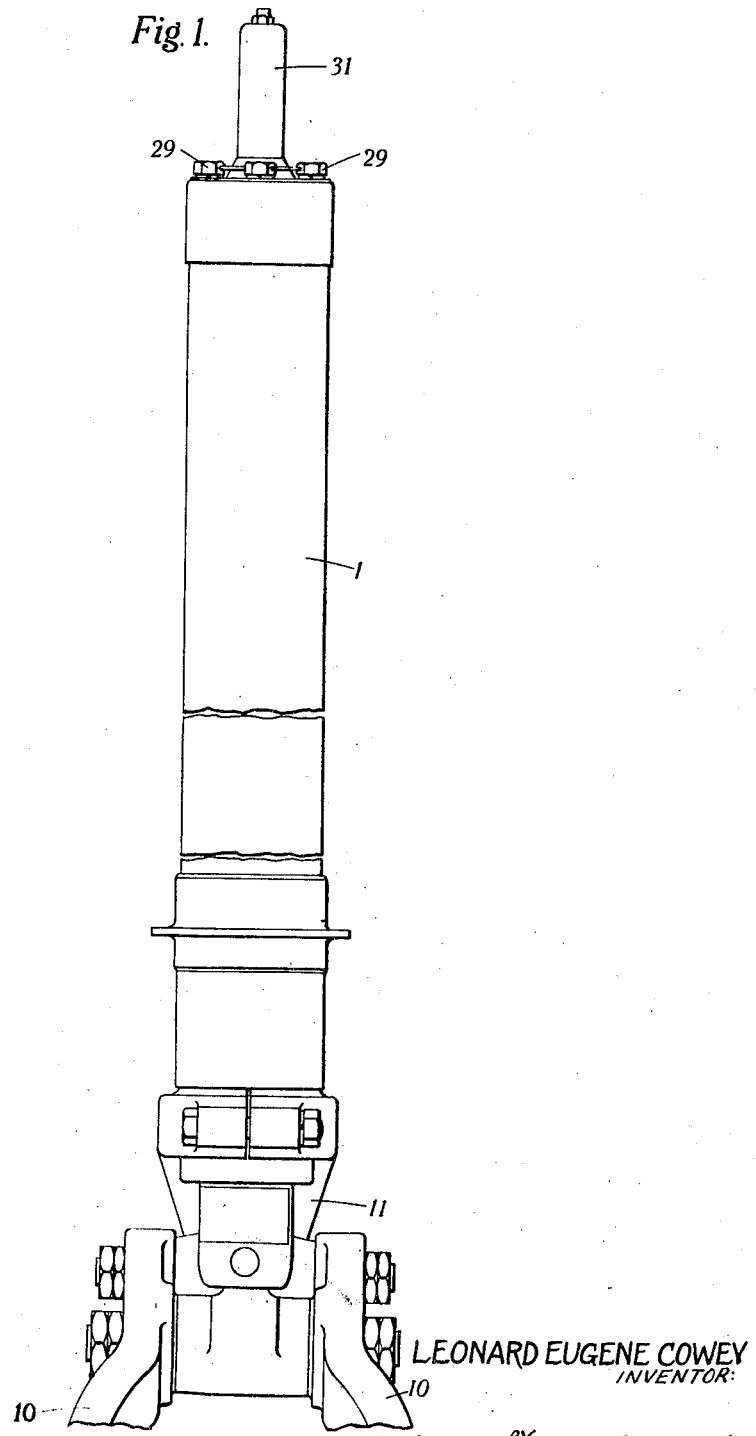
Figure 1 is a fragmentary rear elevation of an oleo-pneumatic tail wheel supporting leg constructed in accordance with the invention.
Figure 2:
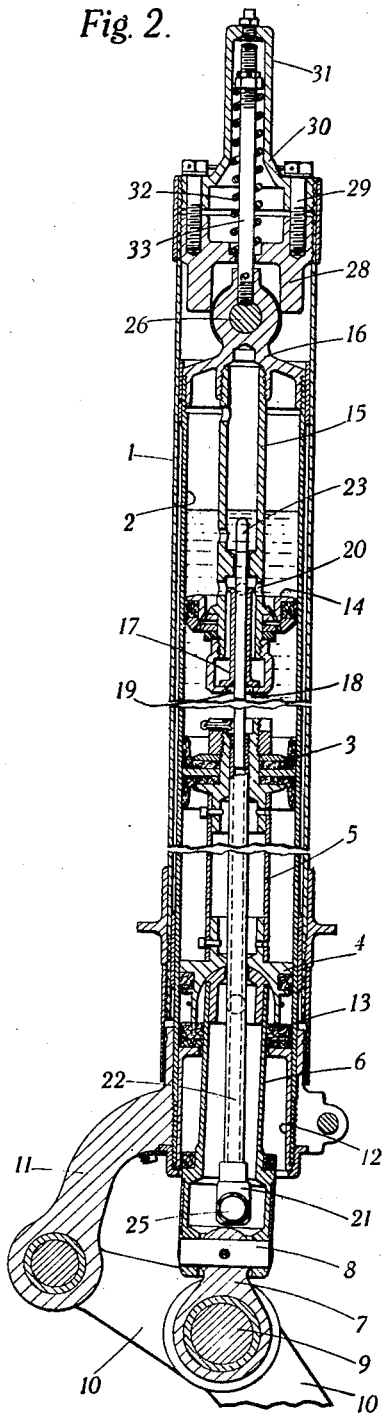
Figure 2 is a longitudinal section of same.

The invention is shown applied to a tail wheel unit of the oleo-pneumatic type, the unit comprising an outer tubular casing 1, which may be disposed substantially vertically or at any suitable angle and is intended for attachment to the airframe of an aircraft in any suitable manner. The outer casing 1 contains a cylinder 2 which has a limited amount of endwise movement within the outer casing for a purpose hereinafter described, and is rotatably mounted therein in upper and lower bearings of the oil retaining type, the cylinder constituting the reservoir for the pressure or shock absorbing medium, consisting of oil and air under pressure. The load to which the wheel is subjected is transferred to the oil and air through the medium of a piston formed in two interconnected parts, the upper part 3 forming the piston proper and a lower part 4, the two parts being connected by a tubular connecting piece 5. A tubular piston rod 6 has a ball or other universal or semi-universal connection with the lower part 4 and is connected at its lower end to an attachment member 7, by a removable pin 8, the member 7 being mounted upon a spindle 9 connecting the members 10 of a two part wheel fork together. The wheel fork is pivotally attached to a fitting 11 which is in turn rigidly secured to the lower end of the cylinder.

The cylinder at its lower end contains a tubular thimble 12 which serves to support packing washers 13 which serve to prevent the ingress of dust and dirt to the lower end of the cylinder and at the same time act as a buffer for the part 4 at the termination of its downward movement. The packing 13 is of such a nature that it fits closely around the piston rod despite angular movement of the latter as a result of upward and downward movements of the piston.

The cylinder is divided into upper and lower compartments by a fixed piston like member 14 carried by a tubular member 15 which in turn is carried by a closure cap 16 closing the cylinder at its upper end, the member 14 containing an axially moving one-way valve 17 which cooperates with a seating 18, the valve during the upstroke of the moving piston being moved off its seating to allow the flow of oil from the lower compartment to the upper compartment by way of the inlet opening 19 which the valve is adapted to open and close, the space surrounding the waisted part of the valve, and exit openings 20 formed in the member 15.

The oil and air supply valve provided for supplying the requisite quantity of oil and air to the upper compartment of the cylinder is situated at the lower end of the piston rod, the valve proper consisting of a ball or other non-return valve located within a valve chamber 21 carried by a tubular member 22 which passes upwardly through the piston member 4 and is attached to the part 3 of the piston. An extension 23 of the member 22 projects upwardly through the member 14 and incidentally constitutes a guide for the valve 17.

Figure 3:
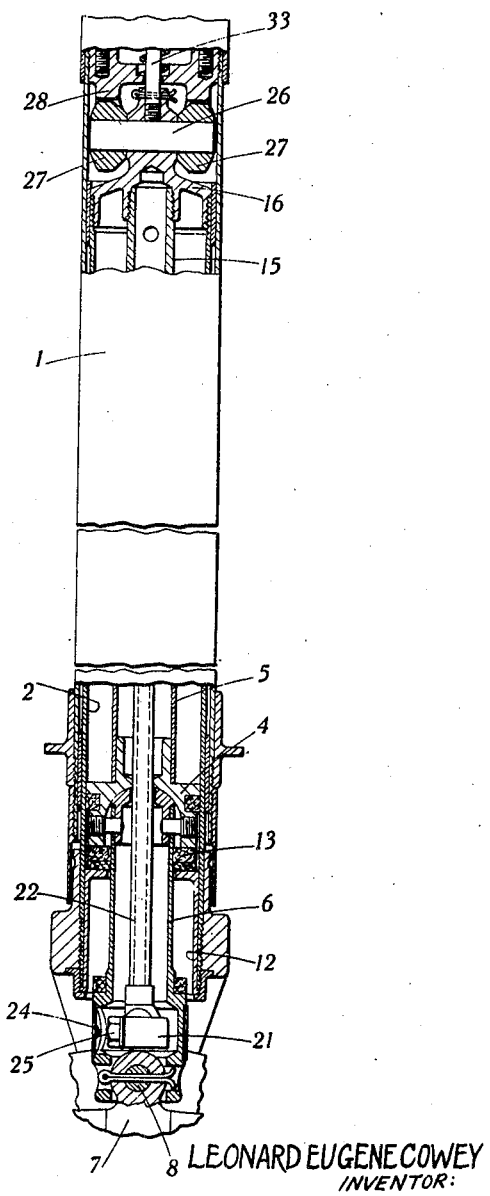
Figure 3 is a fragmentary sectional view taken at right angles to the section illustrated in Figure 2.

Access to the valve in the chamber 21 is obtained by removal of a closure member 24 shown in Figure 3 and a stud 25, and to maintain the requisite quantity of oil and air in the compression cylinder, oil is pumped past the non-return valve and passes upwardly through its associated tube into the upper compartment. The supply of oil is continued until there is an excess of oil in the cylinder, the oil being then allowed to flow out past the non-return valve, the valve being held off its seating for that purpose, until the oil in the upper compartment is level with the upper end of the extension tube 23. A small additional known quantity of oil is then inserted so that the oil level is just above the upper end of the extension tube. In this way the correct oil level in the cylinder is ensured and can be maintained by topping up from time to time. Finally air is forced past the valve under pressure, the air filling that part of the upper compartment lying immediately above the oil level.

In the construction shown the requisite quantity of oil and air is delivered laterally into the chamber 21, the chamber having a laterally arranged inlet opening. In certain cases this lateral introduction of oil and air may not be possible and in such a case the chamber 21 has a downwardly directed inlet opening, access to this opening being achieved by their removal of the pin 8, thus permitting the part 7 to be withdrawn from the hollow piston rod to provide an opening for the introduction of the oil or air supply pipe.

The oil in the upper compartment effectively provides an oil seal and prevents the escape of air past the oil and air admission valve, but should the valve for any reason be faulty, any slight escape of oil will serve visually as an indication of that fact.

The unit incorporates a fully castoring self-centering tail wheel, the cover member 16 carrying a transverse axle 26 on which are mounted two spaced rollers 27 which, when the wheel is in its normal midposition enter recesses in a cam 28, located within the upper part of the casing 1. The cam is formed with external screw threads to engage corresponding screw threads in the outer covering, or carries a separate externally threaded member which engages said screw threads, the cam being connected by threaded studs 29 with a cap 30 closing the casing at its upper end. In the case of a cam provided with a separate externally threaded member the cam and member are formed with inclined cooperating surfaces which frictionally engage one another.

In order to turn the cam axially for the purpose of aligning the tail wheel after the leg is in position in the fuselage of the aircraft, the studs 29 are slackened and the closure cap 30 and cam 28 turned into the required position, the studs being then re-tightened to draw the interengaging screw threads of the cam or its associated threaded member and the screw threads of the closure cap into frictional locking engagement with the screw threads in the outer casing, thereby locking the cam firmly in position. The closure cap is formed with an upward extension 31 containing a coil spring 32 surrounding a threaded stud 33 for maintaining the rollers in contact with the operating surfaces of the cam when the aircraft is in flight, the tubular extension also serving for the attachment of the leg at its upper end to the fuselage of the aircraft.

The cam surfaces are so shaped that due to their interengagement with the rollers and the load applied to the tail wheel which maintains the rollers and cam surfaces in engagement, the tail wheel always tends to return to a mid or centralised position. Thus the weight applied to the tail wheel must be overcome to permit of the wheel moving from its centralised position, in which it lies in line with the longitudinal centre line of the aircraft. The tail wheel can, however, be turned completely round to facilitate men handling the aircraft on the ground. By permitting the cylinder a limited amount of endwise movement within the casing the rollers are capable of riding up the inclined cam surfaces as would be necessary to permit the cylinder being turned angularly about its axis.

Although the invention has been described as applied to a tail wheel unit it is equally applicable to nose wheel units or, in fact, to the legs of main undercarriages, in the latter case no castoring effect being required.

What I claim and desire to secure by Letters Patent of the United States is:

1. An aircraft oleo-pneumatic shock absorber strut comprising a compression cylinder for containing oil and air, a fixed piston like member dividing said cylinder into upper and lower compartments, a valve mounted in said fixed piston controlling the flow of oil from one compartment to the other, a piston slidably mounted within the lower compartment, a tubular piston rod pivotally attached to said piston, a valve located within the lower end of said tubular piston rod for the introduction of oil and air to the upper compartment and a tube carrying said oil and air admission valve extending longitudinally of said piston rod and through said sliding and fixed pistons into said upper compartment, said tube being open at its upper end and carried by said sliding piston.

2. An aircraft oleo-pneumatic shock absorber strut comprising a compression cylinder for containing oil and air, a fixed piston like member dividing said cylinder into upper and lower compartments, a tubular member depending downwardly from the upper end of said cylinder and carrying said fixed piston, a tubular valve mounted axially of said fixed piston controlling the flow of oil from one compartment to the other, a piston slidably mounted within the lower compartment, a tubular piston rod pivotally attached to said piston, a valve located within the lower end of said tubular piston rod for the introduction of oil and air to the upper compartment and a tube carrying said oil and air admission valve extending axially of said piston rod and sliding piston and said tubular valve in said fixed piston, said tub being open at its upper end and projecting above said fixed piston into said upper compartment.

3. An aircraft oleo-pneumatic shock absorber strut comprising a compression cylinder for containing oil and air, a fixed piston like member dividing said cylinder into upper and lower compartments, a tubular member depending downwardly from the upper end of said cylinder and carrying said fixed piston, a tubular valve mounted axially of said fixed piston controlling the flow of oil from one compartment to the other, a piston slidably mounted within the lower compartment, a tubular piston rod pivotally attached to said piston, a valve located within the lower end of said tubular piston rod for the introduction of oil and air to the upper compartment, and a tube carrying said oil and air admission valve extending axially of said piston rod and sliding piston and said tubular valve in said fixed piston, said tube being open at its upper end and projecting above said fixed piston into said upper compartment to an extent sufficient to constitute an oil gauge to determine the quantity of oil in the upper compartment.

LEONARD EUGENE COWEY.